US008980346B2

(12) United States Patent
Arimoto et al.

(10) Patent No.: US 8,980,346 B2
(45) Date of Patent: Mar. 17, 2015

(54) PROCESS FOR PREPARING HARD BUTTER

(75) Inventors: Shin Arimoto, Yokosuka (JP); Hidetaka Uehara, Yokosuka (JP); Tomomi Suganuma, Yokosuka (JP); Kinya Tsuchiya, Chuo-ku (JP); Satoshi Negishi, Yokosuka (JP)

(73) Assignee: The Nisshin Oillio Group, Ltd., Tokyo (JP)

( * ) Notice: Subject to any disclaimer, the term of this patent is extended or adjusted under 35 U.S.C. 154(b) by 461 days.

(21) Appl. No.: 12/676,791

(22) PCT Filed: Sep. 8, 2008

(86) PCT No.: PCT/JP2008/066172

§ 371 (c)(1),
(2), (4) Date: Mar. 5, 2010

(87) PCT Pub. No.: WO2009/031679

PCT Pub. Date: Mar. 12, 2009

(65) Prior Publication Data

US 2010/0255152 A1 Oct. 7, 2010

(30) Foreign Application Priority Data

Sep. 7, 2007 (JP) ................................ 2007-232566
Mar. 11, 2008 (JP) ................................ 2008-061052

(51) Int. Cl.

*A23D 9/00* (2006.01)
*C11C 3/10* (2006.01)
*A21D 2/16* (2006.01)
*A23G 1/36* (2006.01)
*C11C 1/10* (2006.01)
*C11C 3/12* (2006.01)

(52) U.S. Cl.

CPC . *C11C 3/10* (2013.01); *A21D 2/165* (2013.01); *A23D 9/00* (2013.01); *A23G 1/36* (2013.01); *C11C 1/10* (2013.01); *C11C 3/12* (2013.01)
USPC ............................ 426/33; 426/601; 426/634

(58) Field of Classification Search

USPC ........................... 426/33, 601, 615, 629, 634
See application file for complete search history.

(56) References Cited

U.S. PATENT DOCUMENTS

| | | | | |
|---|---|---|---|---|
| 4,268,527 | A | 5/1981 | Matsuo et al. | |
| 4,795,569 | A | 1/1989 | Higuchi et al. | |
| 4,985,358 | A | 1/1991 | Sawamura et al. | |
| 5,045,243 | A | 9/1991 | Kuwabara et al. | |
| 5,288,619 | A * | 2/1994 | Brown et al. | 435/134 |
| 6,060,028 | A | 5/2000 | Yoneda et al. | |
| 6,069,263 | A | 5/2000 | Yoneda et al. | |
| 6,969,771 | B2 | 11/2005 | Okada et al. | |
| 2004/0152908 | A1 | 8/2004 | Okada et al. | |
| 2006/0105935 | A1 | 5/2006 | Suzuki et al. | |
| 2006/0141592 | A1* | 6/2006 | Sumida et al. | 435/134 |
| 2006/0165867 | A1 | 7/2006 | Kuwabara et al. | |
| 2007/0160739 | A1 | 7/2007 | Kuwabara et al. | |
| 2008/0280020 | A1* | 11/2008 | Kugitani et al. | 426/634 |

FOREIGN PATENT DOCUMENTS

| | | | |
|---|---|---|---|
| CN | 1806043 | | 7/2006 |
| EP | 1 028 159 | A1 | 8/2000 |
| EP | 2042607 | | 4/2009 |
| JP | 55-71797 | A | 5/1980 |
| JP | 60-395 | B2 | 1/1985 |
| JP | 62-61589 | A | 3/1987 |
| JP | 6/2155048 | | 7/1987 |
| JP | 63-258995 | A | 10/1988 |
| JP | 2-80495 | A | 3/1990 |
| JP | 3-69516 | B2 | 11/1991 |
| JP | 6-9465 | B2 | 2/1994 |
| JP | 6-181686 | A | 7/1994 |
| JP | 7-49592 | B2 | 5/1995 |
| JP | 7-155107 | A | 6/1995 |
| JP | 7-81156 | B2 | 8/1995 |
| JP | 7-98956 | B2 | 10/1995 |
| JP | 11-80776 | A | 3/1999 |
| JP | 11-246893 | | 9/1999 |
| JP | 2002-69484 | A | 3/2002 |
| JP | 2002-121587 | | 4/2002 |
| JP | 2003/000832 | A1 | 1/2003 |
| JP | 2004-123839 | A | 4/2004 |
| JP | 3588902 | B2 | 8/2004 |
| KR | 2007-0006656 | | 1/2007 |
| WO | WO 96/10643 | A1 | 4/1996 |
| WO | WO 03/000832 | A1 | 1/2003 |

(Continued)

OTHER PUBLICATIONS

JP 11-246893, 1999, translation.*

International Search Report (PCT/ISA/210) dated Oct. 7, 2008 corresponds to PCT/JP2008/066172.

Written Opinion (PCT/ISA/237) dated Oct. 7, 2008 corresponds to PCT/JP2008/066172.

International Search Report (PCT/ISA/210) dated Dec. 16, 2008 corresponds to PCT/JP2008/066173.

(Continued)

*Primary Examiner* — Leslie Wong

(74) *Attorney, Agent, or Firm* — Buchanan, Ingersoll & Rooney PC

(57) ABSTRACT

The present invention relates to a process for preparing a hard butter, which comprises conducting transesterification between one or more selected from the group consisting of straight-chain saturated C16-22 fatty acids and lower alcohol esters thereof and a triglyceride having oleoyl group and/or linoleoyl group at the 2-position with an action of a granulated powder lipase comprising a lipase derived from *Rhizopus oryzae* and/or *Rhizopus delemar* and a soybean powder, and removing the granulated powder lipase after the transesterification. The process is industrially suitable process for preparing a hard butter, which have excellent properties as a cacao butter equivalent.

9 Claims, No Drawings

(56) References Cited

FOREIGN PATENT DOCUMENTS

| | | | |
|---|---|---|---|
| WO | WO 2004/029185 | A1 | 4/2004 |
| WO | WO 2005/063952 | A1 | 7/2005 |

OTHER PUBLICATIONS

Written Opinion (PCT/ISA/237) dated Dec. 16, 2008 corresponds to PCT/JP2008/066173.

Grachyova I.M. et al., "Tekhnologiya fermentnykh perparatov" 3-izdanie, pererab. i dop., M., Elevar, 2000, p. 359, line 6.

Official Action dated Apr. 28, 2012, issued in corresponding Russian Patent Application No. 2010113506, and an English Translation thereof (6 pages).

European Search Report issued in corresponding EP Patent Application No. 08829035.8-1357, mailed on Mar. 27, 2013.

Ebihara et al., Database WPI, XP002694057, (Jul. 10, 1987).

Janssen et al., *An improved method for sn-2 position analysis of triacylglycerols in edible oils and fats based on immobilized lipase D* (*Rhizopus delemar*), 112 Journal of Chromatography 141-147 (2006).

Kamiyama et al., Chocolate product having good feel when eaten—comprises mixt. of cocoa fat and hard butter contain mainly symmetric triglyceride(s), XP 002664701 abstract (Jun. 20, 1995).

Taiwanese Office Action mailed on Jun. 4, 2013, in corresponding Taiwanese Patent Application 097134034.

Translation of the Written Opinion of the International Searching Authority issued in PCT/JP2008/066172 (Mar. 7, 2010).

Korean Office Action issued on Aug. 8, 2014, in corresponding Korean Patent Application No. 10-2010-7007464.

Korean Office Action issued on Aug. 8, 2014, in corresponding Korean Patent Application No. 9-5-2014-054346812.

* cited by examiner

PROCESS FOR PREPARING HARD BUTTER

TECHNICAL FIELD OF THE INVENTION

The present invention relates to a process for preparing triglycerides ($F_{MS}OF_{MS}$) having saturated C16-22 fatty acid residues at the 1,3-positions and oleoyl group at the 2-position, and specifically relates to a process for preparing a hard butter excellent as a cacao butter equivalent (CBE). The present invention also relates to a process for preparing triglycerides ($F_{MS}LF_{MS}$) having saturated C16-22 fatty acid residues at the 1,3-positions and linoleoyl group (linoleic acid residue) at the 2-position, and specifically relates to a process for preparing a hard butter excellent as a hardness conditioning agent of chocolate.

BACKGROUND OF THE INVENTION

Hard butter including cacao butter is used extensively for foods in the filed of confectionary production and bread making, which primarily includes chocolate, and pharmaceuticals, cosmetics and the like. Such hard butter comprises, as a primary component, triglycerides ($F_{MS}OF_{MS}$) having one unsaturated bond in the molecule such as 1,3-dipalmitoyl-2-oleoylglycerin (POP), triglyceride having oleoyl group at the 2-position and each one of palmitoyl group and stearoyl group (POS), and 1,3-distearoyl-2-oleoylglycerin (SOS). There are also known triglycerides having two unsaturated bond in the molecule such as 1,3-distearoyl-2-linoleoylgrycerin (SLS) excellent as a hardness conditioning agent of chocolate.

In general, the above-described triglycerides are available as natural fats and oils containing such triglycerides, for example, palm oil, shea butter, sal fat, illipe butter and the like or fractioned oils thereof. Among these, palm oil is used as a fat and oil rich in POP, illipe butter is used as a fat and oil rich in POS, and shea butter, sal fat and the like are used as a fat and oil rich in SOS. For hard butter such as cacao butter equivalent, these fats and oils are usually used directly or by blending in an appropriate manner. However, since shea butter, sal fat, illipe butter and the like are obtained from wild plants, the yield and the price thereof significantly vary depending on factors such as weather. In the worst case, there is a problem that required quantity of such fat and oil is not ensured.

Thus, processes for preparing the above-described triglycerides, which use transesterification of particular fatty acids under 1,3-selective lipase, have been proposed (Patent Literatures 1 to 5), instead of obtaining the above-described triglycerides as fractionated oils of fats and oils such as palm oil, shea butter, sal fat and illipe butter. These Patent Literatures describe that lipases derived from *Rhizopus* sp., *Aspergillus* sp. and *Mucor* sp., pancreatic lipase and rice bran lipase are used as 1,3-selective lipase.

In the case of such transesterification, fatty acid after transesterification is usually recovered and hydrogenated to reuse. In this case, when plural kinds of fatty acids are used as the raw materials in order to prepare triglyceride such as POS wherein fatty acid residues at the 1,3-positions are different from each other, it is necessary to have additional steps for rebalancing composition of fatty acid raw material by analyzing the recovered fatty acid material and adding a lacking fatty acid(s) to the material.

Therefore, it is desired to develop more efficiently and more industrially suitable processes for preparing a hard butter as a cacao butter equivalent.

Patent Literature 1: JP-A-55-071797
Patent Literature 2: JP-B 03-069516
Patent Literature 3: JP-B 06-009465
Patent Literature 4: WO96/10643
Patent Literature 5: WO03/000832

DISCLOSURE OF THE INVENTION

An object of the present invention is to provide an industrially suitable process for preparing a hard butter which has excellent properties as a cacao butter equivalent.

Another object of the present invention is to improve reaction selectivity and reaction efficiency in the industrially suitable process for preparing a hard butter which has excellent properties as a cacao butter equivalent.

Additional object of the present invention is to provide an industrially suitable process for preparing a hard butter which has excellent properties as cacao butter equivalent, which process is simple without rebalancing the fatty acid raw material.

By conducting transesterification between one or more selected from the group consisting of straight-chain saturated C16-22 fatty acids and lower alcohol esters thereof and a triglyceride having oleoyl group and/or linoleoyl group at the 2-position with an action of a granulated powder lipase which is obtained by granulating a specific lipase together with a specific material comprising protein, the above mentioned problems can be solved. The present invention has been completed on the basis of these findings.

Namely, the present invention provides a process for preparing a hard butter, which comprises conducting transesterification between one or more selected from the group consisting of straight-chain saturated C16-22 fatty acids and lower alcohol esters thereof and a triglyceride having oleoyl group and/or linoleoyl group at the 2-position with an action of a granulated powder lipase comprising a lipase derived from *Rhizopus oryzae* and/or *Rhizopus delemar* and a soybean powder, and removing the granulated powder lipase after the transesterification.

The present invention also provides a process for preparing triglyceride having straight-chain saturated fatty acid residue at the 1-position which is different from that at the 3-position. Furthermore, the present invention provides the process wherein differences between each mass percent of C16, C18, C20 and C22 fatty acids in the straight-chain saturated fatty acids and lower alcohol esters thereof and each mass percent of C16, C18, C20 and C22 fatty acid residues at the 1- and 3-positions of triglyceride having oleoyl group and/or linoleoyl group at the 2-position are within 10%, which does not need rebalancing fatty acid and low alcohol ester thereof as a raw material to be recovered and reused.

According to the present invention, by using stearic acid or lower alcohol ester(s) thereof, fat and oil rich in SOS and/or SLS can be obtained simply and effectively. By using behenic acid or lower alcohol ester(s) thereof, fat and oil rich in 1,3-behenyl-2-oleoylglycerin (BOB) and/or 1,3-behenyl-2-linoleoylglycerin (BLB) can be obtained. Similarly, by using a mixture of stearic acid and palmitic acid or a mixture of lower alcohol ester of stearic acid and lower alcohol ester of palmitic acid, fat and oil rich in POS and/or PLS which is difficult to prepare can be obtained. Also, by using lower alcohol esters of palmitic acid, fat and oil rich in POP and/or PLP can be obtained. By using each of fats and oils rich in SOS, BOB, POS, POP, SLS, BLB, PLS or PLP obtained as described above independently or mixing them in a desired ratio, there can be obtained hard butters as a cacao butter equivalent which have properties similar to those of cacao butter or have new properties which are different from those of cacao butters. These hard butters can provide excellent chocolate products, especially by combining with cacao butter and sweetener(s).

According the present invention, when the triglyceride having the straight-chain saturated fatty acid residue at the 1-position which is different from that at the 3-position, the process cannot need rebalancing raw fatty acid and lower alcohol ester thereof as the material to be recovered and reused, thus the process can be simple. Additionally, since certain fatty acid is not excess in the recovered fatty acid and lower alcohol ester thereof, recovered fatty acid and lower alcohol ester thereof can be used without discarding a part thereof. Thus the process having a good material efficiency can be provided.

BEST MODE FOR CARRYING OUT THE INVENTION

Preferable examples of the fat and oil material used in the process for preparing hard butter of the present invention include fats and oils rich in triglycerides having oleoyl group and/or linoleoyl group at the 2-position. Particularly, a fat and oil comprising a constant amount (preferably 1 to 70% by mass) of triglyceride having, in advance, the saturated fatty acid residue to be introduced at either the 1- or 3-position such as SOO and POO is preferred, because use of such fats and oils can reduce a requisite amount of the saturated fatty acid or the low alcohol ester thereof described below. Specifically, examples of the triglyceride or the fat and oil having oleoyl group at the 2-position include 1,3-dilauroyl-2-oleoylglycerin, 1,3-dimiristoyl-2-oleoylglycerin, trioleoylglycerin, low melting fraction of shea butter (for example, iodine value 70 to 80), high oleic sunflower oil, high oleic safflower oil, high oleic low linolenic rapeseed oil, palm oil, fractionated palm oil and mixtures thereof. Examples of the fat and oil having linoleoyl group at the 2-position include high linoleic safflower oil, soybean oil, grape seed oil and the like.

Among these, low melting fraction of shea butter, high oleic sunflower oil, high oleic low linolenic rapeseed oil, palm oil and fractionated palm oil described above are preferred. To prepare the hard butter rich in SOS, low melting fraction of shea butter or high oleic sunflower oil is preferably used. To prepare the hard butter rich in POS, fractionated palm oil, specifically which is obtained by bifractionation of palm oil and has 40% by mass or more (and preferably 95% by mass or less) of the total content of POP and POO, is preferably used. To prepare the hard butter rich in PLP or SLS, high linoleic safflower oil is preferred.

As the saturated C16-22 fatty acid, stearic acid, palmitic acid and behenic acid are preferred.

A lower alcohol in lower alcohol esters of saturated C16-22 fatty acid is preferably C1-6 alcohol, and specifically methanol, ethanol or isopropyl alcohol is preferred. Among them, ethanol is the most preferable.

A use ratio (molar ratio) of the triglyceride having oleoyl group in the 2-position to saturated C16-22 fatty acid and/or lower alcohol ester thereof is preferably ½ or less, specifically ½ to 1/30 is preferred.

In the present invention, it is preferred to use stearic acid and/or lower alcohol ester thereof as the one or more selected from the group consisting of straight-chain saturated C16-22 fatty acids and lower alcohol esters thereof to prepare the hard butter rich in 1,3-distearoyl-2-oleoylglycerin (SOS) and/or 1,3-distearoyl-2-linoleoylgrycerin (SLS). Alternatively, it is preferred to use palmitic acid or lower alcohol ester thereof instead of stearic acid and/or lower alcohol ester thereof to prepare the hard butter rich in 1,3-dipalmitoyl-2-oleoylglycerin (POP) and/or 1,3-dipalmitoyl-2-linoleoylgrycerin (PLP). It is also preferred to use behenic acid or lower alcohol ester thereof to prepare the hard butter rich in 1,3-dibehenyl-2-oleoylglycerin (BOB) and/or 1,3-dibehenyl-2-linoleoylglycerin (BLB).

Furthermore, in the present invention, it is preferred to use the mixture of palmitic acid or lower alcohol ester thereof and stearic acid or lower alcohol ester thereof as the one or more selected from the group consisting of straight-chain saturated C16-22 fatty acids and lower alcohol esters thereof to prepare the hard butter rich in the triglyceride having an oleoyl group and/or linoleoyl group at the 2-position and each one of palmitoyl group and stearoyl group (POS and/or PLS).

In the present invention, similarly, it is preferred to use a mixture of behenic acid or lower alcohol ester thereof and palmitic acid or lower alcohol ester thereof as the one or more selected from the group consisting of straight-chain saturated C16-22 fatty acids and lower alcohol esters thereof to prepare hard butter rich in a triglyceride having an oleoyl group and/or linoleoyl group at the 2-position and each one of behenyl group and palmitoyl group (BOP and/or BLP).

Alternatively, it is preferred to use a mixture of behenic acid or lower alcohol ester thereof and stearic acid or lower alcohol ester thereof as the one or more selected from the group consisting of straight-chain saturated C16-22 fatty acids and lower alcohol esters thereof to prepare a hard butter rich in a triglyceride having an oleoyl group and/or linoleoyl group at the 2-position and each one of behenyl group and stearoyl group (BOS and/or BLS).

Here, the phrase "hard butter rich in SOS and/or SLS" means that 1,3-distearoyl-2-oleoylglycerin and/or 1,3-distearoyl-2-linoleoylgrycerin occupies 10% by mass or more of a total amount of triglycerides constituting a hard butter, preferably that SOS and/or SLS is the largest amount of triglyceride. It is preferred that the upper limit of the amount of SOS and/or SLS is 90% by mass. The phrase "hard butter rich in POS and/or PLS" means that POS and/or PLS occupies 10% by mass or more in the total amount of the triglycerides constituting the hard butter, preferably that POS and/or PLS is the largest amount of triglyceride. It is preferred that the upper limit of the amount of POS and/or PLS is 90% by mass.

According to the present invention, in transesterification using two or more fatty acids having different carbon number as the straight-chain saturated C16-22 fatty acid and lower alcohol ester thereof, changing a ratio of the fatty acids can change a ratio of symmetric triglyceride having oleoyl group and/or linoleoyl group at the 2-position such as POP and/or PLP to asymmetric triglyceride having oleoyl group and/or linoleoyl group at the 2-position such as POS and/or PLS. Meanwhile, in the present invention, fatty acids and lower alcohol esters thereof remaining in the reaction system after transesterification can be hydrogenated as necessary to reuse.

In the case of reusing, when a fatty acid formulation of fatty acid and lower alcohol ester thereof to be reused is the same as that of the triglyceride having oleoyl group at the 2-position, it has the advantage that there is no need to rebalance fatty acid. It is preferred that the differences between each mass percent of C16, C18, C20 and C22 fatty acids in the straight-chain saturated fatty acids and lower alcohol esters thereof and each mass percent of C16, C18, C20 and C22 fatty acid residues at the 1- and 3-positions of the triglyceride having an oleoyl group at the 2-position are within 10%. The differences are more preferably within 5% and most preferably within 3%. For example, when a fractionated palm oil in which whole fatty acid residues at the 1- and 3-positions is occupied by C16 fatty acids of 50% by mass and C18 fatty acids of 50% by mass is transesterified with a mixture of ethyl palmitate and ethyl stearate, it is preferred to use a mixture of ethyl palmitate of 35 to 65% by mass and ethyl stearate of 65 to 35% by mass.

For the lipase used in the present invention, *Rhizopus delemar* and *Rhizopus oryzae* belonging to *Rhizopus* genus can be used, and 1,3-specific lipase is preferable.

Such lipase includes Picantase R8000 (manufactured by Robin), Lipase F-AP15 (manufactured by Amano Enzyme Inc.) and the like, although the most suitable lipase includes Lipase DF "Amano" 15-K (manufactured by Amano Enzyme Inc. and also referred to as Lipase D) derived from *Rhizopus oryzae*. These are powdery lipases. In addition, Lipase DF "Amano" 15-K had been described as a lipase derived from *Rhizopus delemar* in the past.

As the lipase used in the present invention, that obtained by drying a lipase-containing aqueous solution comprising lipase culture components and the like may be used. In the present invention, it is preferred to use lipase powders having a spherical shape and a water content of 10% by mass or less. Specifically, it is preferred that 90% by mass or more of the lipase powders have a particle size of 1 to 100 μm. Also, the lipase powders prepared by spray drying a lipase-containing aqueous solution adjusted to pH 6 to 7.5 are preferable.

In the present invention, a granulated powder lipase which is granulated with a soybean powder and followed by powdering (also referred to as "powdered lipase") is used.

Here, as a soybean powder, it is preferred to use a soybean powder having a fat content of 5% by mass or more. In such soybean powder, the fat content is preferably 10% by mass or more and more preferably 15% by mass or more, while it is preferred that the fat content is 25% by mass or less. Specifically, the soybean powder having a fat content of 18 to 23% by mass is preferred.

In this connection, examples of the fat contained in the soybean powder include fatty acid triglycerides and analogs thereof. The fat content in the soybean powder can be easily determined by means such as Soxhlet extraction method.

In the present invention, as such soybean powder, whole soybean flour can be used. Alternatively, a soymilk can be used as a material of the soybean powder. The soybean powder can be prepared by grinding soybeans by conventional means. The soybean powders preferably have a particle size of approximately 0.1 to 600 μm. The particle size can be determined by means similar to that used in determining the particle size of the powdered lipase.

An amount used of the soybean powder is preferably 0.1 to 200 times, more preferably 0.1 to 20 times and the most preferably 0.1 to 10 times by mass of the amount used of the lipase.

It is preferred that the powdered lipase used in the present invention has a water content of 10% by mass or less, and specifically a water content of 1 to 8% by mass is preferred.

The particle size of the powdered lipases can be optional. However, 90% by mass or more of the powdered lipases preferably have a particle size of 1 to 100 μm. The powdered lipase preferably has an average particle size of 10 to 80 μm. The powdered lipase preferably has a spherical shape.

For example, the particle size of the powdered lipase can be determined with Particle Size Distribution Analyzer (LA-500) of HORIBA, Ltd.

The powdered lipase used in the present invention can be prepared by drying an aqueous solution in which the lipase and the soybean powder are dissolved and dispersed by any of drying means selected from the groups consisting of spray drying, freeze drying and solvent precipitating followed by drying.

The aqueous solution in which the lipase and the soybean powder are dissolved and dispersed can be obtained by dissolving and dispersing the lipase powder and the soybean powder into a water, mixing the lipase powder with an aqueous solution in which the soybean powder is dissolved and dispersed, or mixing the soybean powder with a lipase-containing aqueous solution described below.

In the step of drying the aqueous solution in which the lipase and the soybean powder are dissolved and dispersed, particles of the lipase and/or the soybean powder agglutinate, and then a granulated substance comprising the lipase and the soybean powder is formed. The granulated substance may comprise lipase culture components.

The powdered lipase prepared as described above can be directly used in the transesterification.

The amount of water in the aqueous solution in which the lipase and the soybean powder are dissolved and dispersed is determined by adjusting the mass of the water to the total mass of the lipase and the soybean powder. Specifically, the mass of the water is preferably 0.5 to 1,000 times, more preferably 1.0 to 500 times and the most preferably 3.0 to 100 times of the total mass of the lipase and the soybean powder.

Particularly, when the powdered lipase is prepared by spray drying, the mass of water is preferably 2.0 to 1,000 times, more preferably 2.0 to 500 times and the most preferably 3.0 to 100 times of the total mass of lipase and soybean powder, because of character of devices for spray drying.

In the case of the lipase-containing aqueous solution is used as the material of the lipase, when the content of the lipase in the lipase-containing aqueous solution is unknown, the content of the lipase can be determined by freeze drying or other vacuum drying the lipase-containing aqueous solution to calculate a mass of the lipase.

Here, the aqueous solution containing the lipase includes a lipase culture solution from which cell bodies are removed, a purified culture solution thereof; a solution in which lipase obtained from these culture solutions is dissolved and dispersed again; a solution in which a commercially available powdery lipase is dissolved and dispersed again; and a commercially available liquid lipase. In order to enhance a lipase activity, it is more preferred that low-molecular-weight components such as salts are removed from the solution. In order to enhance the powder property, it is more preferred that low-molecular-weight components such as sugars are removed from the solution.

The lipase culture solution includes, for example, aqueous solutions containing soybean flour, peptone, corn steep liquor, $K_2HPO_4$, $(NH_4)_2SO_4$, $MgSO_4$. $7H_2O$ and the like. The concentrations thereof are as follows: the soybean flour is 0.1 to 20% by mass and preferably 1.0 to 10% by mass; peptone is 0.1 to 30% by mass and preferably 0.5 to 10% by mass; the corn steep liquor is 0.1 to 30% by mass and preferably 0.5 to 10% by mass; $K_2HPO_4$ is 0.01 to 20% by mass and preferably 0.1 to 5% by mass; $(NH_4)_2SO_4$ is 0.01 to 20% by mass and preferably 0.05 to 5% by mass; and $MgSO_4.7H_2O$ is 0.01 to 20% by mass and preferably 0.05 to 5% by mass. The culture conditions thereof should be controlled as follows: the culture temperature is 10 to 40° C. and preferably 20 to 35° C.; the quantity of airflow is 0.1 to 2.0 VVM and preferably 0.1 to 1.5 VVM; the rotation speed for stirring is 100 to 800 rpm and preferably 200 to 400 rpm; pH is 3.0 to 10.0 and preferably 4.0 to 9.5.

The separation of cell bodies is preferably conducted by centrifugation, the membrane filter procedure and the like. The removal of the low-molecular-weight components such as salts and sugars can be treated with ultrafiltration membranes. Specifically, after the treatment with ultrafiltration membranes, the aqueous solution containing a lipase is concentrated so as to become ½ volume thereof; and then, the same amount of a phosphate buffer as that of the concentrated solution is added thereto. By repeating these procedures once to 5 times, the aqueous solution containing a lipase can be obtained, from which the low-molecular-weight components are removed.

The centrifugation is preferably controlled to 200 to 20,000×g. The pressure applied to the membrane filter is preferably controlled by microfiltration membranes, the filter press and the like to become not more than 3.0 kg/m$^2$. In case of enzymes in the cell body, it is preferred that cell breakage thereof is conducted by the homogenizer, Waring blender, the ultrasonic disruption, the French press, the ball mill and the like; then the cell residues are removed by centrifugation, the membrane filter procedure and the like. The rotation speed of the homogenizer for stirring is 500 to 30,000 rpm and preferably 1,000 to 15,000 rpm. The rotation speed of Waring blender is 500 to 10,000 rpm and preferably 1,000 to 5,000 rpm. The time for stirring is 0.5 to 10 minutes and preferably 1 to 5 minutes. It is preferred that the ultrasonic disruption is conducted under the condition of 1 to 50 KHz and more preferably 10 to 20 KHz. It is preferred that the ball mill has glass pellets having the diameter of 0.1 to 0.5 mm.

In some stage before the drying process, the aqueous solution containing a lipase may be concentrated. The concentration methods are not particularly limited and they include evaporator, flash evaporator, concentration by ultrafiltration, concentration by microfiltration, salting out by inorganic salts, precipitation methods with solvents, absorption methods with ion-exchange cellulose and the like, and water absorption methods with water-absorbing gels. Among these, the concentration by ultrafiltration and evaporator are preferable. The module for the concentration by ultrafiltration is preferably a flat membrane or a hollow fiber membrane having a fractioned molecular weight of 3,000 to 100,000 and more preferably 6,000 to 50,000. The materials of the membrane are preferably polyacrylonitrile, polysulfonic and the like.

Next, spray drying, freeze drying and solvent precipitating followed by drying are described, which are means for drying the aqueous solution in which the lipase and the soybean powder are dissolved and dispersed.

It is preferred that spray drying is conducted by spray dryers such as nozzle countercurrent flow, disk countercurrent flow, nozzle concurrent flow and disk concurrent flow, and the disk concurrent flow is more preferable. The spray drying is preferably controlled as follows: the rotation speed of the atomizer is 4,000 to 20,000 rpm; and heating is 100 to 200° C. for inlet temperature and 40 to 100° C. for outlet temperature. Particularly, it is preferred that the temperature of the aqueous solution comprising the lipase and the soybean powder is adjusted at 20 to 40° C. and then it is sprayed into dry atmosphere at 70 to 130° C. It is also preferred to adjust the aqueous solution to pH 7.5 to 8.5 before drying.

It is preferred that freeze drying (lyophilization) is conducted, for example, with laboratory-sized small scale freeze dryers or shelf freeze dryers. Additionally, freeze drying can be conducted by drying under the reduced-pressure.

The solvent precipitating followed by drying is conducted as follows: the aqueous solution in which the lipase and the soybean powder are dissolved and dispersed is gradually added to a solvent to be used to form a precipitate, the resulting precipitate is collected by centrifugation with centrifugal separators, and then the collected precipitate is dried under the reduced-pressure. A series of such operation is preferably conducted under low temperature conditions below room temperature in order to prevent denaturation and deterioration of the powdered lipase.

The solvent used in the solvent precipitating includes, for example, aqueous solvents and hydrophilic solvents such as ethanol, acetone, methanol, isopropyl alcohol and hexane. Mixtures of such solvents can be used. Among them, ethanol or acetone is preferably used in order to enhance the activity of the powdered lipase.

The amount of the solvent used in the solvent precipitating is preferably not limited, although the volume of the solvent is preferable 1 to 100 times and more preferable 2 to 100 times of the volume of the aqueous solution in which lipase and soybean powder are dissolved and dispersed.

After the solvent precipitating, precipitate can be obtained by leaving at rest followed by filtration. However, the precipitate can be also obtained by light centrifugation at approximately 1,000 to 3,000×g. Drying the obtained precipitate can be conducted, for example, by drying under the reduced-pressure.

In the present invention, a fatty acid ester(s) and/or fatty acid(s) may be further added in the stage of preparing the powdered lipase. Specifically, the powdered lipase can be obtained by bringing the aqueous solution in which the lipase and the soybean powder are dissolved and dispersed into contact with the fatty acid ester and/or fatty acid followed by drying.

Such contact with fatty acid ester and/or fatty acid can further improve activity and stability of the lipase.

The fatty acid ester usable includes fatty acid esters of monoalcohol or polyalcohol and fatty acids. The fatty acid ester of polyalcohol may be partial ester or full ester.

Here, the monoalcohol includes sterols such as alkyl monoalcohol, phytosterol and the like. The alkyl moiety constituting alkyl monoalcohol is preferably C6-12 middle chain alkyl or C13-22 long chain alkyl and may be saturated or unsaturated and straight-chain or branched-chain. As such phytosterol, for example, sitosterol, stigmasterol, campesterol, fucosterol, spinasterol, brassicasterol and the like are preferable. Examples of the polyalcohol include glycerin, glycerin condensation products such as diglycerin and decaglycerin, glycols such as propylene glycol, sorbitol and the like.

The constituent fatty acid of the fatty acid ester and the fatty acid used in the present invention are preferably fatty acids derived from fats and oils but are not particularly limited to those. For example, C6-12 middle chain fatty acids such as hexanoic acid, octanoic acid, decanoic acid and undecanoic acid, and C13-22 long chain unsaturated fatty acids such as oleic acid, linoleic acid, linolenic acid, ricinoleic acid and erucinic acid are included.

There are also included other long chain saturated fatty acids such as tetradecanoic acid, hexadecanoic acid, octadecanoic acid, eicosanic acid and docosanoic acid.

As the fatty acid ester used in the present invention, one or more selected from fats and oils, diglycerides and monoglycerides which have a fatty acid(s) derived from fats and oils as their structural component is preferred. A mixture of partial ester and fatty acid which are obtained by hydrolysis of a part of fatty acid ester(s) can be also used.

In this connection, it is preferred to select the fatty acid ester and fatty acid used in the powdered lipase, which are the same as the material used in transesterification or esterification with the powdered lipase.

The fat and oil used as the fatty acid ester is not limited particularly. However, it is preferred to use a fat and oil being liquid at the reaction temperature, when the powdered lipase is prepared by hydrolysis followed by esterification reaction.

Such fats and oils include, for example, one or mixture of the followings: vegetable fats and oils such as rapeseed oil, sunflower oil, olive oil, corn oil, coconut oil, sesame oil, safflower oil, soybean oil, high oleic varieties thereof, cottonseed oil, rice oil, linseed oil, palm oil, fractionated palm oil, palm kernel oil, camellia oil, cacao butter, shea butter, fraction of shea butter, sal fat, fraction of sal fat and illipe butter; triglycerides (synthesized fats and oils) such as triolein (trioleic acid glyceride), tricaprylin (trioctanoic acid glyceride), triacetin (triacetic acid glyceride) and tributyne (tributanoic acid glyceride); and animal fats and oils such as fish oil, beef tallow and lard. Among them, vegetable fats and oils are preferable.

When the fatty acid ester or the combination of fatty acid ester and fatty acid is used as a material of the powdered lipase, the powdered lipase can be prepared as follows: the fatty acid ester or the combination of fatty acid ester and fatty acid is added to and brought into contact with the aqueous solution in which the lipase and the soybean powder are dissolved and dispersed, and the solution is homogeneously stirred with a stirrer or three-one motor and the like to hydrolysis and/or emulsify and disperse, and then the solution is dried by a drying method selected from spray drying, freeze drying or solvent precipitating followed by drying.

Here, the drying can be also conducted by dehydrating accompanied with transesterification. Namely, the hydrolysis and/or emulsifying and dispersion is conducted and followed by transesterification with dehydrating, and as needed, the oil comprising unreacted material and the like is filtered out, to prepare the powdered lipase.

The additive amount of the fatty acid ester and/or fatty acid used in preparing the powdered lipase is preferably 0.1 to 500 times by mass, more preferably 0.2 to 100 times by mass, and most preferably 0.3 to 50 times by mass of the total mass of the lipase and the soybean powder.

However, in the case of preparing the powdered lipase by spray drying, the additive amount of the fatty acid ester and/or fatty acid used is preferably 0.1 to 10 times by mass, more preferably 0.2 to 10 times by mass, and most preferably 0.3 to 10 times by mass of the total mass of the lipase and the soybean powder.

In the case of using spray drying, this is because that excessive additive amount of the fatty acid ester and/or fatty acid causes problems as follows: evaporation of moisture becomes incomplete; it becomes hard to collect the obtained powdered lipase due to excessive fatty acid ester and/or fatty acid, and the like.

Improvements of devices for spray drying or changes in collecting manner can heighten the upper limit of the additive amount of the fatty acid ester and/or fatty acid used, additional steps such as filtration will be required when the fatty acid ester and/or fatty acid is contained more than necessary.

When the powdered lipase containing the fatty acid ester and/or fatty acid is prepared with solvent precipitating, the solvent used is preferably 1 to 100 times by volume and more preferably 2 to 10 times by volume of the total mass of the fatty acid ester and/or fatty acid and the aqueous solution in which the lipase and the soybean powder are dissolved and dispersed.

When the after-mentioned filter aid is added previous to the solvent precipitating, the solvent is used in consideration of the mass of the filter aid which is additionally combined into the total mass.

The stage of preparing the powdered lipase can further comprise a step of adding the filter aid.

Usable filter aids include silica gel, cerite, cellulose, starch, dextrin, activated carbon, activated clay, kaolin, bentonite, talc, sand and the like. Among them, silica gel, cerite or cellulose is preferred. The particle size of the filter aid may be optional, although 1 to 100 μm is preferable, 5 to 50 μm is particularly preferred.

The filter aid usable before, after or in the middle of transesterification is added preferably in the amount of 1 to 500% by mass and more preferably in the amount of 10 to 200% by mass of the total mass of the lipase and the soybean powder. This is because use of the amount falling within such ranges makes loads in the time of filtrating smaller and needs not large-scale filtration equipments and treatments before filtration such as high centrifugation.

The filter aid can be also contained in the powdered lipase. When spray drying or freeze drying is conducted to obtain the powdered lipase, the filter aid can be added either before or after the drying.

When the drying is conducted by the solvent precipitating followed by drying, it is preferred that the filter aid is added to the powdered lipase obtained by the drying.

The amount of the filter aid contained in the powdered lipase obtained can be 1 to 500% by mass, and is more preferably 10 to 200% by mass of the total mass of the lipase and the soybean powder.

In the present invention, the powdered lipase described above is added to the material comprising triglyceride having oleoyl group at the 2-position and saturated C16-22 fatty acid and/or lower alcohol ester thereof to transesterify by conventional means. In this case, it is preferred that 0.01 to 10 parts by mass (preferably 0.01 to 2 parts by mass, and more preferably 0.1 to 1.5 parts by mass) of the powder lipase is added to the material based on 100 parts by mass thereof and transesterification is conducted for 0.1 to 50 hours (preferably 0.5 to 30 hours, and more preferably 1 to 20 hours) at a temperature of 30 to 100° C. (preferably 35 to 80° C., and more preferably 40 to 60° C.). The reaction is preferably conducted in batch reaction. The reaction temperature may be any temperature at which the reactive substrate fat and oil can melt and enzyme can be activated. The optimal reaction time varies depending on additive amount of oxygen, reaction temperature and the like.

After transesterification, it is preferred that fatty acid and/or lower alcohol ester thereof is removed. Although any way of removing can be used, distilling is preferably used.

After transesterification, or alternatively after removing fatty acid and/or lower alcohol ester thereof, conventional fractionating step is preferably conducted. The fractionating may be conducted with or without solvent. Examples of the solvent used in solvent fractionation include acetone, hexane, ethanol, hydrous ethanol and the like, and acetone and hexane are preferable. Here, it is preferred that 50 to 1000 parts by mass of the solvent is added to 100 parts by mass of the transesterification product to fractionate.

Although the hard butter can be obtained in this way, conventional purification of fat and oil such as solvent removal, fatty acid removal, fatty acid lower alcohol removal, decolorization, deodorization and the like can be conducted, if needed.

Chocolate products comprise a fat and oil component and a sugar component, the fat and oil component being a mixture of the hard butter described above and cacao butter. It is preferable that the hard butter described above be incorporated into the fat and oil component at 10% by mass or more, preferably at 20% by mass or more, and the most preferably at 30% by mass or more. For the sugar component, any sugars usually used in chocolates can be used. For example, sucrose, fructose and mixture thereof are included. Sugar alcohols such as sorbitol can be used also. Furthermore, the chocolate products of the present invention can comprise other optional components comprised in conventional chocolate products. Examples of the optional components include emulsifying agent which is typically lecithin, flavoring, powdered skim milk, powdered whole milk and the like.

Next, the present invention will be explained in detail by the following Examples.

Preparation Example 1

Preparing Powdered Lipase Composition 1

An aqueous solution of 10% deodorized whole fat soybean flour, which is sold under the trade name of "Alphaplus HS-600" manufactured by Nisshin Cosmo Foods, Ltd. and has 23% fat content by mass was previously autoclave sterilized for 15 minutes at 121° C. and cooled to the extent of room temperature. Triple amount of the cooled solution was added to an enzyme solution of Lipase DF "Amano" 15-K manufactured by Amano Enzyme Inc. and also referred to as Lipase D (150000 Um') with stirring. The resulting solution was adjusted to pH 7.8 with 0.5N NaOH solution and then spray dried with spray dryer (Tokyo Rikakikai Co., LTD, SD-1000). As the result, powdered lipase composition 1 (90% by mass of the powdered lipases have 1 to 100 μm particle size) was obtained.

Example 1

10 g of low melting fraction of shea butter (Lipex205: Aarhuskarlshamn AB) and 10 g of stearic ethyl ester (Ethyl Stearate: Inoue Perfumery MFG. Co., LTD) were mixed, 0.5% by mass of the powdered lipase composition 1 was added thereto, and then reacted with stirring for 4 hours at 60° C. The resulting solution was filtrated to remove the powdered enzyme, and as the result, 18.0 g of reaction product 1 was obtained.

Comparative Example 1

10 g of low melting fraction of shea butter (Lipex205: Aarhuskarlshamn AB) and 10 g of stearic ethyl ester (Ethyl Stearate: Inoue Perfumery MFG. Co., LTD) were mixed, 15.0% by mass of Lipozyme RM-IM which is immobilized lipase derived from *Mucor miehei* (Novozymes A/S) were added thereto, and then reacted with stirring for 4 hours at 60° C. The resulting solution was filtrated to remove the immobilized enzyme. As the result, 18.0 g of reaction product 2 was obtained.

TAG compositions of the reaction products 1 and 2 were analyzed by GLC method (Hereafter, TAG compositions were analyzed by the same method). XOX/(XXO+OXX) was analyzed by HPLC method using a column bonded cation-exchange groups associated with silver. The results are shown in Table 1.

TABLE 1

| TAG composition | | | |
|---|---|---|---|
| composition of TAG (%) | Low melting fraction of Shea butter | Reaction product 2 (Comparative Example 1) | Reaction product 1 (Example 1) |
| $PS_2$ | t r | 2.0 | 1.0 |
| POS | 4.4 | 6.4 | 6.5 |
| $PO_2$ | 6.9 | 1.4 | 1.4 |
| $S_3$ | t r | 3.3 | 2.3 |
| $S_2O$ | 2.1 | 38.0 | 39.0 |
| $SO_2$ | 54.3 (containing SLS) | 20.3 | 19.3 |
| $S_2L$ | | 9.8 | 10.1 |
| $O_3$ | 9.8 | 2.1 | 2.0 |
| SOL | 9.3 | 7.2 | 7.1 |
| Others | 13.2 | 9.5 | 11.3 |
| XOX/(XXO + OXX) | 98/2 | 97/3 | 98/2 |

Notes:
TAG composition represents composition of each triglyceride in the total triglycerides.
XOX/(XXO + OXX) represents a ratio of triglycerides having saturated fatty acid residues at the 1- and 3-positions to triglycerides having saturated fatty acid residue at the 2-position among triglycerides having two saturated fatty acid residues and one oleoyl group.
P: palmitic acid residue,
S: stearic acid residue,
O: oleic acid residue,
L: linoleic acid residue,
t r: trace These results show that the present invention provides XOX/(XXO+OXX) not lower than XOX/(XXO+OXX) of low melting fraction of shea butter, and that the powdered lipase composition 1 improves the reaction selectivity and the reaction efficiency compared with Lipozyme RM-IM which is a typical immobilized enzyme (Comparative Example 1).

Example 2

8 g of high oleic sunflower oil (Olein Rich: Showa Sangyo Co., LTD) and 12 g of ethyl stearate (Ethyl Stearate: Inoue Perfumery MFG. Co., LTD) were mixed, 0.5% by mass of the powdered lipase composition 1 were added thereto, and then reacted with stirring for 7 hours at 40° C. The resulting solution was filtrated to remove the powdered enzyme. As the result, 19 g of reaction product 3 was obtained.

Comparative Example 2

8 g of high oleic sunflower oil (Olein Rich: Showa Sangyo Co., LTD) and 12 g of ethyl stearate (Ethyl Stearate: Inoue Perfumery MFG. Co., LTD) were mixed, 15.0% by mass of Lipozyme RM-IM which is immobilized lipase derived from *Mucor miehei* (Novozymes A/S) were added thereto, and then reacted with stirring for 7 hours at 40° C. The resulting solution was filtrated to remove the powdered enzyme. As the result, 19 g of reaction product 4 was obtained.

TABLE 2

| Results of TAG composition | | |
|---|---|---|
| TAG composition (%) | Reaction product 3 (Example 2) | Reaction product 4 (Comparative Example 2) |
| $PS_2$ | t r | 0.2 |
| POS | 4.3 | 4.3 |
| $PO_2$ | 1.6 | 1.5 |
| $S_3$ | t r | 2.2 |
| $S_2O$ | 46.4 | 43.0 |
| $SO_2 + S_2L$ | 37.3 | 36.5 |
| $O_3$ | 6.0 | 6.1 |
| SOL | 3.4 | 3.4 |

TABLE 2-continued

| Results of TAG composition | | |
|---|---|---|
| TAG composition (%) | Reaction product 3 (Example 2) | Reaction product 4 (Comparative Example 2) |
| Others | 1.0 | 2.8 |
| XOX/(XXO + OXX) | 99/1 | 97/3 |

Notes:
TAG composition represents composition of each triglyceride in the total triglycerides.
XOX/(XXO + OXX) represents a ratio of triglycerides having saturated fatty acid residues at the 1- and 3-positions to triglycerides having saturated fatty acid residue at the 2-position among triglycerides having two saturated fatty acid residues and one oleoyl group.
P: palmitic acid residue,
S: stearic acid residue,
O: oleic acid residue,
L: linoleic acid residue,
t r: trace These results show that the present invention improves the reaction selectivity and the reaction efficiency in light of XOX/(XXO+OXX) of the resulting products, the used amounts of enzymes and the reaction time.

Example 3

1200 g of high oleic sunflower oil (Olein Rich: Showa Sangyo Co., LTD) and 1800 g of ethyl stearate (Ethyl Stearate: Inoue Perfumery MFG. Co., LTD) were mixed, 0.5% by mass of the powdered lipase composition 1 were added thereto and then reacted with stirring for 7 hours at 40° C. The resulting solution was filtrated to remove the powdered enzyme. As the result, 2978 g of reaction product 5 was obtained. The obtained reaction product 5 (2978 g) was film distilled, and fraction 5 (1700 g) and distilled residue 5 (1270 g) were obtained from the reaction product at a distillation temperature of 140° C. The distilled residue 5 was dry fractionated, and as the result, solid phase 5 (600 g) and liquid phase 5 (600 g) were obtained. In addition, the fraction 5 (1700 g) was completely hydrogenated by conventional means, and as the result, 1600 g of hydrogenated product 5 was obtained.

[First Cycle]

600 g of high oleic sunflower oil (Olein Rich: Showa Sangyo Co., LTD) was mixed with the liquid phase 5 (600 g) and the hydrogenated product 5 (1200 g) which were obtained as described above, 0.5% by mass of the powdered lipase composition 1 was added thereto and reacted with stirring for 7 hours at 40° C. The resulting solution was filtrated to remove the powdered enzyme. As the result, 2376 g of reaction product 6 was obtained. The obtained reaction product 6 (2376 g) was film distilled, and fraction 6 (1150 g) and distilled residue 6 (1150 g) were obtained from the reaction product at a distillation temperature of 140° C. The distilled residue 6 was dry fractionated, and as the result, solid phase 6 (570 g) and liquid phase 6 (570 g) were obtained. In addition, the fraction 6 (1150 g) was completely hydrogenated by conventional means, and as the result, hydrogenated product 6 (1100 g) was obtained.

[Second Cycle]

550 g of high oleic sunflower oil (Olein Rich: Showa Sangyo Co., LTD) was mixed with the liquid phase 6 (550 g) and the hydrogenated product 6 (1100 g) which were obtained as described above, 0.5% by mass of the powdered lipase composition 1 was added thereto and then reacted with stirring for 7 hours at 40° C. The resulting solution was filtrated to remove the powdered enzyme. As the result, reaction product 7 (2178 g) was obtained. The obtained reaction product 7 (2376 g) was film distilled, and fraction 7 (1080 g) and distilled residue 7 (1080 g) were obtained from the reaction product at a distillation temperature of 140° C. The distilled residue 7 was dry fractionated, and as the result, solid phase 7 (535 g) and liquid phase 7 (535 g) were obtained. In addition, the fraction 7 (1080 g) was completely hydrogenated by conventional means, and as the result, hydrogenated product 7 (1000 g) was obtained.

TABLE 3

| Results of TAG composition | | | | | | |
|---|---|---|---|---|---|---|
| TAG composition (%) | Reaction product 5 | Reaction product 6 | Reaction product 7 | Distilled residue 5 | Distilled residue 6 | Distilled residue 7 |
| $PS_2$ | t r | t r | t r | t r | t r | t r |
| POS | 4.3 | 3.9 | 3.7 | 4.3 | 3.9 | 3.8 |
| $PO_2$ | 1.6 | 1.7 | 1.7 | 1.6 | 2.0 | 1.7 |
| $S_3$ | t r | t r | t r | t r | t r | t r |
| $S_2O$ | 46.4 | 42.8 | 43.3 | 46.4 | 41.6 | 43.1 |
| $SO_2 + S_2L$ | 37.3 | 38.3 | 37.8 | 37.3 | 38.0 | 38.1 |
| $O_3$ | 6.0 | 7.3 | 6.9 | 6.0 | 7.7 | 6.9 |
| SOL | 3.4 | 4.6 | 4.7 | 3.4 | 4.6 | 4.7 |
| Others | 1.0 | 1.4 | 1.9 | 1.0 | 2.2 | 1.7 |
| XOX/(XXO + OXX) | 99/1 | 99/1 | 99/1 | 99/1 | 99/1 | 99/1 |

Notes:
TAG composition represents composition of each triglyceride in the total triglycerides.
XOX/(XXO + OXX) represents a ratio of triglycerides having saturated fatty acid residues at the 1- and 3-positions to triglycerides having saturated fatty acid residue at the 2-position among triglycerides having two saturated fatty acid residues and one oleoyl group.
P: palmitic acid residue,
S: stearic acid residue,
O: oleic acid residue,
L: linoleic acid residue,
t r: trace Example 4

1200 g of high oleic sunflower oil (Olein Rich: Showa Sangyo Co., LTD) and 1800 g of ethyl stearate (Ethyl Stearate: Inoue Perfumery MFG. Co., LTD) were mixed, 0.5% by mass of the powdered lipase composition 1 were added thereto and then reacted with stirring for 7 hours at 40° C. The resulting solution was filtrated to remove the powdered enzyme. As the result, reaction product 8 (2987 g) was obtained. The obtained reaction product 8 (2900 g) was film distilled to remove fatty acid ethyl ester at a distillation temperature of 140° C., and as the result, distilled residue 8 (1100 g) was obtained. The obtained distilled residue 8 (1100 g) was dissolved by adding 2000 g of hexane thereto. The resulting solution was cooled to −10° C., and then a generated solid phase was filtered out. Subsequently, the resulting was subjected to removal of hexane and purification by conventional means, and as the result, hard butter 1 (450 g) was obtained.

TABLE 4

| TAG composition | |
|---|---|
| | Example 4 Hard butter 1 |
| $PS_2$ | t r |
| POS | 5.6 |
| $PO_2$ | t r |
| $S_3$ | t r |
| $S_2O$ | 82.6 |
| $SO_2$ | 8.6 |
| $S_2L$ | 3.2 |
| $O_3$ | t r |
| SOL | t r |
| Others | |
| XOX/(XXO + OXX) | 99/1 |

Notes:
TAG composition represents composition of each triglyceride in the total triglycerides.
XOX/(XXO + OXX) shows a ratio of triglycerides having saturated fatty acid residues at the 1- and 3-positions to triglycerides having saturated fatty acid residue at the 2-position among triglycerides having two saturated fatty acid residues and one oleoyl group.
P: palmitic acid residue,
S: stearic acid residue,
O: oleic acid residue,
L: linoleic acid residue,
t r: trace

Example 5

Raw material 9 was prepared by mixing 1200 g of PL65 (INTERCONTINENTAL SPECIALTY FATS SDN BHD) with 1400 g of ester stearate (Ethyl Stearate: Inoue Perfumery MFG. Co., LTD) and 1400 g of ethyl palmitate (Ethyl Palmitate: Inoue Perfumery MFG. Co., LTD), 0.3% by mass of the powdered lipase composition 1 was added thereto and reacted with stirring for 16 hours at 40° C. The resulting solution was filtrated to remove the powdered enzyme. As the result, 3999 g of reaction product 9 was obtained. The obtained reaction product 9 (3993 g) was film distilled, and fatty acid ethyl ester was distilled away at a distillation temperature of 140° C. As the result, 1316 g of distilled residue 9 and 2656 g of fraction 9 were obtained.

By solvent fraction with 5 times amount (wt/wt) of acetone, a high melting fraction was removed at a cooling temperature of 20° C. and a low melting fraction was removed at a cooling temperature of 10° C. from the obtained distilled residue 9. Subsequently, the resulting was purified by conventional means, and as the result, 391 g of hard butter 2 (HB2) was obtained.

TAG compositions of the material PL65, the distilled residue 9 and the hard butter 2 are shown in Table 5. Fatty acid compositions of PL65 (total fatty acids, fatty acids at the 2-position, fatty acids at the 1,3-positions) are shown in Table 6. Fatty acid ethyl ester compositions of the raw material 9, the reaction product 9 and the fraction 9 are shown in Table 7. Fatty acid composition was analyzed by GLC method. Fatty acid composition of fatty acids at the 2-position was analyzed by GLC method using hydrolysis reaction with 1,3-specific enzyme. Fatty acid composition of fatty acids at the 1,3-positions was calculated from results of the fatty acid composition of total fatty acids and the fatty acid composition of fatty acids at the 2-position.

Before and after the enzyme reaction, a ratio of C16 fatty acid ethyl esters to C18 fatty acid ethyl esters showed little change. In a reaction using fatty acid ethyl ester, it is desired to use fatty acid ethyl ester repetitively, because fatty acid ethyl esters are very expensive. Therefore, it is desired that the ratio of C16 fatty acid ethyl esters to C18 fatty acid ethyl esters do not change before and after the reaction. Regarding the fatty acid composition of fatty acids at the 1,3-positions in the material PL65, C16 fatty acids and C18 fatty acids are comprised in nearly equal amount, and this fatty acid composition is desired to be equal to fatty acid ethyl ester composition in materials provided at the time of the reaction. In addition, oleic acid (18:1) and lower alcohol ester thereof can be easily changed to stearic acid (18:0) and lower alcohol ester thereof by hydrogenation reaction.

TABLE 5

| Results of TAG composition analysis | | | | |
|---|---|---|---|---|
| TAG composition (%) | Material 9 | Reaction product 9 | Distilled residue 9 | Hard butter 2 |
| P3 | | 3.4 | 3.4 | 1.4 |
| P2S | | 4.9 | 4.9 | 0.6 |
| P2O | 18.3 | 20.1 | 20.1 | 22.4 |
| P2L | 11.7 | 7.4 | 7.4 | 2.5 |
| $PS_2$ | | 2.2 | 2.2 | |
| POS | 2.8 | 25.3 | 25.0 | 44.6 |
| $PO_2$ | 36.2 | 5.9 | 5.9 | 1.6 |
| PSL | | 9.4 | 9.3 | 4.9 |
| POL | 13.9 | 3.3 | 3.3 | 0.7 |
| $S_3$ | | 0.3 | 0.3 | |
| $S_2O$ | 0.3 | 7.7 | 7.8 | 17.3 |
| $SO_2$ | 3.0 | 3.6 | 3.7 | 1.0 |
| $S_2L$ | 0.1 | 2.7 | 2.7 | 2.3 |
| $O_3$ | 4.3 | 0.3 | 0.3 | 0.4 |
| Others | 9.4 | 3.5 | 3.7 | 0.3 |

Notes:
TAG composition represents composition of each triglyceride in the total triglycerides.
P: palmitic acid residue,
S: stearic acid residue,
O: oleic acid residue,
L: linoleic acid residue,
t r: trace

TABLE 6

| Results of fatty acid composition analysis of PL65 | | | |
|---|---|---|---|
| | Composition of total fatty acids | Composition of fatty acids at the 2-position | Composition of fatty acids at the 1,3-positions |
| 12:0 | 0.4 | 0.6 | 0.3 |
| 14:0 | 1.1 | 0.6 | 1.3 |
| 15:0 | 0.1 | | 0.1 |
| 16:0 | 34.5 | 7.1 | 48.1 |
| 16:1 | 0.3 | 0.2 | 0.3 |
| 17:0 | 0.1 | | 0.1 |
| 18:0 | 3.7 | 0.4 | 5.3 |
| 18:1 | 46.2 | 64.3 | 37.2 |
| 18:2 | 12.7 | 26.2 | 5.9 |
| 18:3 | 0.2 | 0.3 | 0.1 |
| 20:0 | 0.3 | | 0.4 |
| 20:1 | 0.2 | | 0.3 |
| 22:0 | 0.1 | | 0.1 |
| 24:0 | 0.1 | | 0.1 |
| Others | | 0.3 | 0.4 |
| C16 | 34.8 | 7.3 | 48.4 |
| C18 | 62.9 | 91.2 | 48.5 |

TABLE 7

| Results of fatty acid ethyl ester composition analysis of raw material 9, reaction product 9 and fraction 9 | | | |
|---|---|---|---|
| | Material 9 | Reaction product 9 | Fraction 9 |
| 16:0 | 50.1 | 49.5 | 49.4 |
| 18:0 | 49.9 | 40.2 | 40.3 |
| 18:1 | | 10.3 | 10.3 |
| C16 | 50.1 | 49.5 | 49.4 |
| C18 | 49.9 | 50.5 | 50.6 |

Example 6

2600 g of the fraction 9 obtained in Example 5 was measured out, and 7.8 g of nickel catalyst (SO-850: SAKAI CHEMICAL INDUSTRY Co., LTD) was added thereto and reacted for 3 hours at 180° C. and 3 kg/cm$^2$ in a pressure vessel with supplying hydrogen gas. The catalyst was removed by filtration, and as the result, 2525 g of hydrogenated fatty acid ethyl ester (hydrogenated product 9) was obtained. The composition is shown in Table 8.

TABLE 8

| Result of fatty acid ethyl ester composition analysis of the hydrogenated fatty acid ethyl ester (hydrogenated product 9) | | |
|---|---|---|
| | Before hydrogenation | After hydrogenation |
| 16:0 | 49.4 | 49.5 |
| 18:0 | 40.3 | 50.5 |
| 18:1 | 10.3 | — |
| C16 | 49.4 | 49.5 |
| C18 | 50.6 | 50.5 |

Example 7

2100 g of the hydrogenated fatty acid ethyl ester 9 obtained in Example 6 was added to 900 g of PL65 (INTERCONTINENTAL SPECIALTY FATS SDN BHD) and mixed to prepare material 10. 0.3% by mass of the powdered lipase composition 1 was added to the prepared material 10 and reacted with stirring for 16 hours at 40° C. The powdered enzyme was removed by filtration, and as the result, 2968 g of reaction product 10 was obtained.

TAG compositions of the material PL65 and the reaction product 10 are shown in Table 9. Fatty acid ethyl ester compositions of the material oil (PL65) and reacted oil (the reaction product 10) are shown in Table 10.

The reaction using the hydrogenated fatty acid ethyl ester 9 succeed in the same way as the reaction using palmitic acid and stearic acid. Additionally, the ratio of C16 fatty acid ethyl esters to C18 fatty acid ethyl esters hardly changed before and after the reaction. From the results described above, it is shown that fatty acid ethyl esters can be used repeatedly by distilling and hydrogenation.

TABLE 9

| Results of TAG composition analysis | | |
|---|---|---|
| TAG composition (%) | PL65 | Reaction product 10 |
| P3 | | 3.1 |
| P2S | | 4.0 |
| P2O | 18.3 | 21.8 |
| P2L | 11.7 | 7.7 |
| $PS_2$ | | 1.5 |
| POS | 2.8 | 26.0 |
| $PO_2$ | 36.2 | 5.8 |
| PSL | | 10.8 |
| POL | 13.9 | 3.3 |
| $S_3$ | | 0.2 |
| $S_2O$ | 0.3 | 7.2 |
| $SO_2$ | 3.0 | 3.3 |
| $S_2L$ | 0.1 | 2.9 |
| $O_3$ | 4.3 | 1.5 |
| Others | 9.4 | 0.9 |

Notes:
TAG composition represents composition of each triglyceride in the total triglycerides.
P: palmitic acid residue,
S: stearic acid residue,
O: oleic acid residue,
L: linoleic acid residue,
t r: trace

TABLE 10

| Results of fatty acid ethyl ester compositions of material oil (the material 10) and reacted oil (the reaction product 10) | | |
|---|---|---|
| | Material 10 | Reaction product 10 |
| 16:0 | 49.5 | 49.5 |
| 18:0 | 50.5 | 40.2 |
| 18:1 | — | 10.3 |
| C16 | 49.5 | 49.5 |
| C18 | 50.5 | 50.5 |

Example 8

A chocolate was prepared experimentally with the above-described hard butter (the hard butter 1 obtained in Example 4) in the formula shown in Table 11 and evaluated. There was no special trouble on its viscosity and demolding property at the time of preparing the chocolate. The obtained chocolate was evaluated regarding snap property, luster and melting property in the mouth after storage for a week at 20° C. As the result, chocolate 1 using the hard butter 1 had a good melting property in the mouth, excellent snap property and a quality equal to comparative chocolate 1 which did not use the equivalent.

TABLE 11

| Formula of chocolate (% by mass) | | |
|---|---|---|
| | Comparative chocolate 1 | Chocolate 1 |
| Sugar | 43.45 | 43.45 |
| Cacao mass | 40.0 | 40.0 |
| *(Cacao butter content) | (22.0) | (22.0) |
| Cacao butter | 16.0 | 1.0 |
| Middle melting fraction of palm oil | — | 7.5 |
| Hard butter 1 of Example 4 | — | 7.5 |
| Lecithin | 0.5 | 0.5 |
| Flavoring | 0.05 | 0.05 |

[Evaluation Result of Chocolate]

Chocolates prepared by the process described above were evaluated regarding demolding property, snap property, luster, and melting property in the mouth. The evaluation result is shown in Table 12.

TABLE 12

| Evaluation result of bars of chocolate | | |
|---|---|---|
| | Comparative chocolate 1 | Chocolate 1 |
| Snap property | ○ | ○ |
| Melting property in the mouth | ○ | ○ |
| Demolding property | ◎ | ◎ |
| Luster | ◎ | ◎ |

The chocolates were evaluated with sensory test by ten panelists. Evaluation criteria are described below.

[Evaluation Criteria]

Snap property ◎: very good snap property

○: good snap property

Δ: inferior snap property

Melting property in the mouth ◎: very good melting property in the mouth

○: good melting property in the mouth

Δ: but melting property in the mouth

Luster ◎: very good

○: good, but dulling is partly shown.

Δ: dulling

Demolding property ◎: It can be remolded after refrigeration for 15 minutes.

○: It can be remolded after refrigeration for 20 minutes.

Δ: It can not be remolded.

Example 9

1400 g of ethyl stearate (Ethyl Stearate: Inoue Perfumery MFG. Co., LTD) was mixed with 1600 g of high linoleic safflower oil (Nisshin OilliO Group, Ltd), 0.3% by mass of the powdered lipase composition 1 was added thereto and reacted with stirring for 20 hours at 40° C. The powdered enzyme was removed by filtration, and 3920 g of reaction product 11 was obtained. The obtained reaction product 11 was film distilled, and fatty acid ethyl ester was removed from the reaction product 11 at a distillation temperature of 140° C. As the result, 1555 g of distilled residue 11 containing 3.7% by mass of fatty acid ethyl was obtained (Table 13).

TABLE 13

| Result of composition analysis | |
|---|---|
| TAG composition (%) | Reaction product 11 |
| $P_2L$ | 0.3 |
| $PS_2$ | 0.3 |
| POS | 1.2 |
| PLS | 5.8 |
| PLO | 0.7 |
| $PL_2$ | 1.6 |
| $S_3$ | 0.7 |
| $S_2O$ | 7.8 |
| $S_2L$ | 39.9 |
| SLO | 10.5 |
| $SL_2$ | 24.8 |
| $OL_2$ | 2.3 |
| $L_3$ | 3.9 |
| Others | 0.2 |

Notes:
TAG composition represents composition of each triglyceride in the total triglycerides.
XOX/(XXO + OXX) represents a ratio of triglycerides having saturated fatty acid residues at the 1- and 3-positions to triglycerides having saturated fatty acid residue at the 2-position among triglycerides having two saturated fatty acid residues and one oleoyl group.
P: palmitic acid residue,
S: stearic acid residue,
O: oleic acid residue,
L: linoleic acid residue,
t r: trace

What is claimed is:

1. A process for preparing a hard butter, which comprises: conducting transesterification between one or more selected from the group consisting of straight-chain saturated C16-22 fatty acids and lower alcohol esters thereof and a triglyceride having oleoyl group and/or linoleoyl group at the 2-position with an action of a granulated powder lipase comprising (i) a lipase derived from *Rhizopus oryzae* and/or *Rhizopus delemar* and (ii) a soybean powder, and removing the granulated powder lipase after the transesterification, wherein the soybean powder has a fat content of 5% by mass or more and wherein the amount of soybean powder is 0.1 to 20 times by mass of the amount of lipase used.

2. The process according to claim 1, wherein the one or more selected from the group consisting of straight-chain saturated C16-22 fatty acids and lower alcohol esters thereof is stearic acid and/or lower alcohol ester thereof, and the hard butter is rich in 1,3-distearoyl-2-oleoylglycerin and/or 1,3-distearoyl-2-linoleoylglycerin.

3. The process according to claim 1, wherein the one or more selected from the group consisting of straight-chain saturated C16-22 fatty acids and lower alcohol esters thereof is a mixture of palmitic acid and/or lower alcohol ester thereof and stearic acid and/or lower alcohol ester thereof, and the hard butter is rich in a triglyceride having oleoyl group and/or linoleoyl group at the 2-position and each one of palmitoyl group and stearoyl group.

4. The process according to claim 1, wherein the triglyceride having oleoyl group at the 2-position is one or more selected from the group consisting of shea butter low melting fraction, high oleic sunflower oil, high oleic safflower oil, high oleic low linolenic rapeseed oil, palm oil and fractionated palm oil.

5. The process according to claim 1, wherein the soybean powder has a fat content of 10 to 25% by mass.

6. The process according to claim 1, wherein the soybean powder is whole fat soybean flour.

7. The process according to claim 1, wherein 90% by mass or more of the granulated powder lipase have a particle size of 1 to 100 μm.

8. The process according to claim 1, which comprises distilling, fractionating and purifying the resultant after removing the granulated powder lipase.

9. The process according to claim 1, wherein the one or more selected from the group consisting of straight-chain saturated C16-22 fatty acids and lower alcohol esters thereof is two or more fatty acids which are different in its carbon number, differences between each mass percent of C16, C18, C20 and C22 fatty acids in the straight-chain saturated fatty acids and lower alcohol esters thereof and each mass percent of C16, C18, C20 and C22 fatty acid residues at the 1- and 3-positions of triglyceride having oleoyl group and/or linoleoyl group at the 2-position are within 10%.

* * * * *